(12) United States Patent
Fujita et al.

(10) Patent No.: US 6,329,105 B1
(45) Date of Patent: Dec. 11, 2001

(54) PATTERN FORMATION METHOD AND APPARATUS USING ATOMIC BEAM HOLOGRAPHY TECHNOLOGY

(75) Inventors: Junichi Fujita; Fujio Shimizu, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/290,189

(22) Filed: Apr. 13, 1999

(30) Foreign Application Priority Data

Apr. 14, 1998 (JP) .................................. 10-102758

(51) Int. Cl.$^7$ ............................. G03H 5/00; H01J 37/317

(52) U.S. Cl. ..................... 430/2; 430/1; 359/8; 359/35; 359/3; 250/251; 250/492.2; 250/492.22

(58) Field of Search ................................ 250/251, 492.2, 250/492.22; 430/1, 2; 359/3, 35, 8

(56) References Cited

U.S. PATENT DOCUMENTS

| | | | |
|---|---|---|---|
| 4,886,964 | * 12/1989 | Pritchard et al. | 250/251 |
| 5,479,238 | 12/1995 | Whitney | 355/53 |
| 5,834,769 | * 11/1998 | Fujita et al. | 250/251 |
| 5,838,468 | * 11/1998 | Manako et al. | 359/35 |
| 5,851,725 | * 12/1998 | McClelland | 430/269 |

FOREIGN PATENT DOCUMENTS

| | | | |
|---|---|---|---|
| 2211957 | * 7/1989 | (GB) | 430/1 |
| 2221353 | * 1/1990 | (GB) | 430/1 |
| 63-500063 | 1/1988 | (JP) | . |
| 5-11454 | 1/1993 | (JP) | . |
| 8-286591 | 11/1996 | (JP) | . |
| 10-39726 | 2/1998 | (JP) | . |
| 10-142806 | 5/1998 | (JP) | . |
| 86/07474 | * 12/1986 | (WO) | 430/1 |

OTHER PUBLICATIONS

Kaufman, W.A., et al., "Focussing a beam of ultracold spin–polarized . . . ", Phys. Rev. Lett., vol. 71(15) pp. 2405–2408, Oct. 1993.*

Berkhout, J.J., et al., "Quantum Reflection: Focusing of hydrogen atoms with a concave mirror", Phys. Rev. Lett., vol. 63(16), pp. 1689–1692, Oct. 1989.*

K. Ogai et al., "Nanofabricating of grating and dot patterns by electron holographic lithography", Appl. Phys. Lett. 66, (Mar. 1995), pp. 1560–1562.

J. Fujita et al., *Nature*, "Manipulation of an atomic beam by a computer–generated hologram", vol. 380, No. 6576, (Apr. 1996), pp. 691–694.

M. Morinaga et al., "Physical Review Letter", Holographic Manipulation of a Cold Atomic Beam, vol. 77, No. 5, (1996), pp. 802–805.

M. Morinaga et al., "Atom Holography", (J. Appl. Phys. Tokyo), vol. 65, No. 9, (1996), pp. 912–918.

F. Shimizu, "A General Review", Laser Cooling of Neutral Atoms and its Applications, Oyo Buturi, vol. 60, (1991), pp. 864–874.

* cited by examiner

*Primary Examiner*—Martin Angebranndt

(57) ABSTRACT

A pattern formation method wherein a very small pattern composed of a desired element (atoms) is formed directly on a substrate by using atomic beam hologram technology. Quantum coherent reflection of an atomic wave is utilized. A coherent atomic beam is irradiated as a material wave, for example, upon a hologram of the transmission type to modulate the atomic beam with pattern information included in the hologram. The atomic beam having passed through and diffracted by the hologram is introduced to a reflecting plane so that the atomic beam may be quantum coherent reflected by the reflecting plane, and the atomic beam thus reflected is introduced into a substrate. A binary (two-value) hologram produced by computer synthesis is used suitably as the hologram. A hologram of the potential control type may be also used.

22 Claims, 9 Drawing Sheets

PATTERN FORMATION METHOD AND APPARATUS USING ATOMIC BEAM HOLOGRAPHY TECHNOLOGY

BACKGROUND OF THE INVENTION

1. Field of the Invention

This invention relates to a patterning method which makes use of an atomic beam holography, and more particularly to a method of and an apparatus for forming a pattern on the surface of a semiconductor substrate and so forth.

2. Description of the Related Art

Progressively increasing attention is paid to technology for using a hologram to transfer a fine pattern on a semiconductor substrate and so forth. The pattern transferring technology by a hologram is regarded as a technique of very fine lithography in fabrication of a VLSI (very large scale integrated circuit).

Stepper technology conventionally employed for fabricating a VLSI uses optical exposure wherein a mask is contacted with a substrate to which a resist is applied to transfer a pattern. Such lithography technology requires a complicated adjusting operation because it employs many lenses for an optical system thereof. Further, the lithography technology is disadvantageous also in that one piece of dust sticking to a mask forms a fatal defect of a transferred pattern. Even with an optical lithography method wherein a reduction projection optical system is used for exposure without contact of a mask with a substrate, the problem of sticking of dust is significant and makes adjustment of the optical system difficult.

On the other hand, pattern transfer by a holographic technique is advantageous in that it does not require a complicated lens system for reproduction of a hologram and pattern transfer can be performed without contact between a mask and a substrate. Therefore, where a stepper is used, the pattern transfer by a holographic technique is not liable to be influenced by dust which causes a problem in a fabrication process. Further, since pattern information recorded on a hologram is distributed over the overall area of the hologram, even if some physical defect occurs with a portion of the hologram, this does not produce a fatal defect in a reproduced image. In other words, the pattern transfer technology which uses a hologram has advantage that it is tough against a defect.

Further, a holographic technique has a characteristic that, if the same optical system as that used upon recording is used to reproduce a hologram, otherwise possible aberration is eliminated. In this instance, the resolution of a final pattern depends on the wavelength. According to an existing stepper which employs a reduction optical system, since the pattern resolution depends on the lens aberration, lithography by a hologram has advantage that a simple optical system can be used to form a high resolution pattern at a wavelength limit when compared with lithography which employs an existing stepper in which a mask and a reduction optical system are used.

Such an optical lithography apparatus which employs holography as described above has already been placed on the market and is operating in a fabrication process on the practical use level. In fabrication of VLSI at present, formation of a pattern approximately on the sub micrometer order is required, and to this end, a light source for use with an optical lithography apparatus by a hologram exhibits gradual reduction in wavelength to a G-line (436 nm) and further to an I-line (365 nm). Recently, it is argued to form a pattern with an ultraviolet (UV) laser such as a Krk excimer laser or an ArF excimer laser.

In pattern formation by holography, the minimum resolution depends on the magnitude of a hologram dry plate and the wavelength of a light source used. Resolution dX is given by a general formula for a lens optical system:

$$dX = \lambda L / D \tag{1}$$

where $\lambda$ is the wavelength, L is the distance between the hologram and the lens, and D is the diameter of the hologram. Since an available hologram is limited in size, pattern resolution dX finally depends on wavelength $\lambda$.

Light emerging from a hologram includes zero-order light and higher-order diffraction light of the first order or higher. Normally, since zero-order light does not include phase information, not zero-order light but higher-order diffraction light is used to reproduce a pattern. This is why an off-axis optical arrangement is taken in reproduction of a hologram, and an inevitable optical arrangement when a hologram is reproduced with higher-order light by which reproduction of a pattern is performed except zero-order light by which reproduction of a pattern cannot be performed is the off-axis arrangement. The off-axis arrangement is an arrangement displaced from an optical axis.

By the way, information recorded on a hologram dry plate is phase and intensity information of wave (light) emerging from a body and is a Fourier transform of the body shape, that is, a pattern. From this, it is possible to produce a hologram of a given body shape or pattern artificially by calculation, and a binary calculation hologram by a computer was produced in 1967. Since then, a method of discrete fast Fourier transform (DFFT) has been improved, and now, a reproduced image of a good quality can be formed and also a three-dimensional (3D) pattern can be formed with a computer-synthesized hologram. In such a binary computer-synthesized hologram as described above, optical information, particularly phase information, from a virtual substance is recorded as information of "0" or "1" on a hologram with an information recording plane of the hologram divided into a finite number of cells. For example, "1" corresponds to a hole (cell) whose light transmittance is 100% while "0" corresponds to a cell whose light transmittance is 0%. A computer-synthesized hologram has such holes formed therein in accordance with phase/intensity information from a virtual substance. Japanese Patent Laid-Open No. Hei 8-286591 (JP, 08286591, A) discloses a technique wherein a computer-synthesized hologram is used and a material wave such as an ion beam, a neutral particle beam or an electron beam is passed through the hologram to project a hologram image on a resist to form a pattern corresponding to the hologram image.

Here, it is examined to improve the resolution of a pattern. In order to improve the resolution of a pattern, the wavelength of wave motion to be used should be made shorter as apparently seen from equation (1) above. In particular, for fine processing for which a wavelength shorter than the wavelength of an excimer laser such as a KrF or ArF excimer laser used at present, it is effective to use an X-ray or an electron beam having a further shorter wavelength as a light source for lithography.

Further, in holographic pattern formation of a high resolution, a wave source having a good coherence should be used as a light source. For example, it is possible to use a material wave (de Bloglie wave) of an electron beam emitted by field emission. K. Ogai, S. Matsui, Y. Kimura and R. Shimizu, in Appl. Phys. Lett. 66, 1560 (1995) disclose an example wherein an electron beam whose energy is 100 keV and whose wavelength is 0.003 nm is used to form a grating by means of a biprism which is a kind of hologram.

In order to diffract wave motion (light) of such a short wavelength as described above, it is necessary to form a hologram pattern of a size approximately equal to one wavelength. The development of the very fine pattern formation technology by electron beam exposure in recent years is so remarkable that it is possible to form a pattern of the 0.02 μm order and a very fine hologram can Fax be formed corresponding to the decreased wavelength of a light source.

The limit in fine pattern formation by the existing pattern formation technology is examined for different kinds of it. Where light is used, the practically available shortest wavelength is approximately 180 nm which is that of an excimer laser, and the wavelength just mentioned is the limit in fine mask pattern formation as a sufficiently fine processing technique is available. In the X-ray lithography, a fine pattern to approximately 20 nm can be formed by utilizing an electron beam for mask pattern formation. Further, a reduction pattern formation method in which a concave X-ray mirror is used can be applied, and it seems possible to form a pattern approximately of a wavelength of an x-ray in principle. However, even if an X-ray or an electron beam is utilized as a radiation source, an existing lithography technique takes a process wherein a pattern is first transferred to an intermediate material such as an organic resist or an inorganic resist and then transferred to a substrate of Si, GaAs or the like material by such a technique as lift-off or etching. Here, resolutions intrinsic to the resist materials matter. Since the photosensitive mechanisms of the resist materials make use of a reaction that a bond of molecules is broken or molecules polymerize finally, the range of secondary electrons in a resist material determines the resolution of the resist material. The range of secondary electrons generally is approximately 5 nm, and as a result, the resolution limitation of a pattern is approximately 10 nm.

The principle of pattern formation in which a hologram is used and the limit to the resolution of pattern formation by lithography are described above. With the conventional lithography which requires transfer of a pattern on a resist once, the pattern transfer makes an obstacle to further refinement of a pattern, and a processing method for forming a pattern smaller than 10 nm is not available.

In such a present situation of technology as described above, the inventors of the present invention have demonstrated holographic pattern formation which uses an atomic beam, for example, in J. Fujita, M. Morinaga, T. Kishimoto, M. Yasuda, Nature, Vol. 380, No. 6576, pp. 691–694 (1996), M. Morinaga, M. Yasuda, T.Kishimoto, F. Shimizu, J. Fujita and S. Matsui, *Phys. Rev. Lett.*, Vol. 77, No. 5, pp. 802–805 (1996), and M. Morinaga, J. Fujita, S. Matsui, F. Shimizu, *Oyo Buturi* (*J. Appl. Phys* (*Tokyo*)), Vol. 65, No. 9, pp. 912–918 (1996). According to the atomic beam holography disclosed in the publications mentioned, a hologram of the transmission type is formed, and the hologram thus formed is used to reproduce a hologram image on an objective substrate by directly projecting the hologram image with an atomic beam to form a pattern. According to the transmission type atomic beam holography, desired atoms,(element) can be deposited on a substrate directly and without requiring a resist process. In fine pattern formation in which a conventional pattern formation technique is used, a fine pattern is formed by a process of etching or lift-off after, as an intermediate process, a pattern is transferred once to an organic or inorganic resist. In contrast, the technique of atomic beam holography is an epoch-making lithography technique in that atoms are deposited directly at a desired place to form a pattern.

However, with the lithography by a transmission type atomic beam hologram described above, the resolution is limited by the size of holes formed in the hologram for passing atoms therethrough. According to the atomic beam holography, it is possible to utilize an atomic wave, which is an atomic beam as a material wave, of a wavelength of the angstrom order in principle, and a wavelength shorter than the distance of atomic arrangement of a substance must be obtained readily. However, formation of a transmission hologram with such an atom size as just mentioned requires a pattern formation technique which can control atoms on the order of atomic arrangement, and this is really impossible. Thus, a technique which overcomes this difficult situation is required.

SUMMARY OF THE INVENTION

It is a first object of the present invention to provide a pattern formation method by which a technique of an atomic beam hologram can be used to form a very fine pattern.

It is a second object of the present invention to provide a pattern formation apparatus by which a technique of an atomic beam hologram can be used to form a very fine pattern.

The inventors of the present invention found out the fact that an atomic beam is totally reflected without losing its coherence under the conditions of a certain reflecting plane and an appropriate angle of incidence. Such total reflection is called quantum coherent reflection, and utilization of quantum coherent reflection allows construction of a reflecting optical system effective to an atomic beam. Further, the inventors found out that, by using an atomic beam reflecting optical system which utilizes quantum coherent reflection or by using a reflection type atomic beam hologram, formation of a pattern on the true angstrom order (sub micrometer order), which has been impossible until now, is allowed, thereby completing the present invention.

The first object of the present invention is achieved by a pattern formation method for forming a pattern on a substrate by atomic beam holography, comprising the steps of introducing an atomic beam having a coherence to a hologram of a transmission type so that the atomic beam may be modulated by the hologram, introducing the modulated atomic beam to a reflecting plane so that the modulated atomic beam may be reflected by the reflecting while the modulated atomic beam keeps phase information, and introducing the atomic beam reflected of from the reflecting plane to the substrate.

The first object of the present invention is achieved also by a pattern formation method for forming a pattern on a substrate by atomic beam holography, comprising the steps of introducing an atomic beam to a hologram of a reflection type so that the atomic beam may be modulated and reflected by the hologram, and introducing the atomic beam reflected from the hologram to the substrate.

The second object of the present invention is achieved by a pattern formation apparatus for forming a pattern on a substrate by atomic beam holography, comprising an atomic beam generator for generating a coherent atomic beam, a hologram of a transmission type for modulating the atomic beam introduced thereto from the atomic beam generator, and a reflecting plane for reflecting the atomic beam emerging from the hologram while the atomic beam keeps phase information so that the atomic beam is introduced to the substrate.

The second object of the present invention is achieved also by a pattern formation apparatus for forming a pattern on a substrate by atomic beam holography, comprising an atomic beam generator for generating a coherent atomic beam, and a hologram of a reflection type for modulating and reflecting the atomic beam introduced thereto so that the atomic beam may be introduced to the substrate.

By employing the pattern formation method by atomic beam holography of the present invention, it is facilitated to form patterns of various elements on the angstrom order at a time, and also an operation to deposit or dope an atom at a desired atom position can be performed directly without a mask. Accordingly, the method of the present invention is very promising as a very fine working technique.

In the present invention, in order to allow diffraction by a hologram, an atomic beam as a coherent material wave (de Bloglie wave) is used. Therefore, it is necessary to generate an atomic beam which is cooled, for example, to approximately 50 $\mu$K by using a technique such as laser trapping. As atomic species which can be used as an atomic beam in the present invention, all of atoms which can be cooled by laser cooling or like means can be listed. For example, atoms which can be cooled by using a resonant laser of two wavelengths come up to 50 in number including B (boron), P (phosphorous), Ca (calcium), Ge (germanium), Si (silicon) and Al (aluminum). Further, if a plurality of resonant lasers are utilized, then approximately 90% of existing elements can be used as an object of pattern formation by atomic beam holography. As regards cooling of atomic beam and formation of a coherent atomic wave, detailed description can be found in F. Shimizu, A General Review, *Oyo Buturi*, Vol . 60, pp. 864–874, 1991. The subject matter of the present invention resides in how hologram information is provided to a coherent atomic beam obtained in this manner and adapted to very fine processing.

In the following description, when it is intended to emphasize that an atomic beam is a coherent material wave, the atomic beam is referred to as atomic wave.

The most significant problem of an optical system for an atomic beam until now is that a lens optical system effective to converge the atomic beam is not available. The sole known lens system is a cylindrical lens which utilizes a potential and a magnetic field and further utilizes a laser standing wave. However, while the cylindrical lens allows formation of a line pattern, it is difficult to apply it to lithography which involves arbitrary reduction or expansion of an arbitrary pattern.

Therefore, the present invention provides a method of constructing a reflecting optical system effective to an atomic wave by holography which makes use of quantum coherent reflection of an atomic wave and examples of application of the method.

According to the present invention, by using quantum coherent reflection and atomic beam holography, a very fine pattern of a desired atom (element) can be formed directly on a substrate. The resolution of a pattern obtained by the method of the present invention is approximately equal to the wavelength of the atomic wave in principle, and the present invention can be applied to formation of future large scale integrated circuits and as very fine three-dimensional structures for which very fine processing on the atom level is required. Further, according to the present invention, an artificial substance whose atom arrangement is controlled can be composed.

The above and other objects, features, and advantages of the present invention will become apparent from the following description referring to the accompanying drawings which illustrate examples of preferred embodiments of the present invention.

DESCRIPTION OF THE PREFERRED EMBODIMENTS

Figure 1:
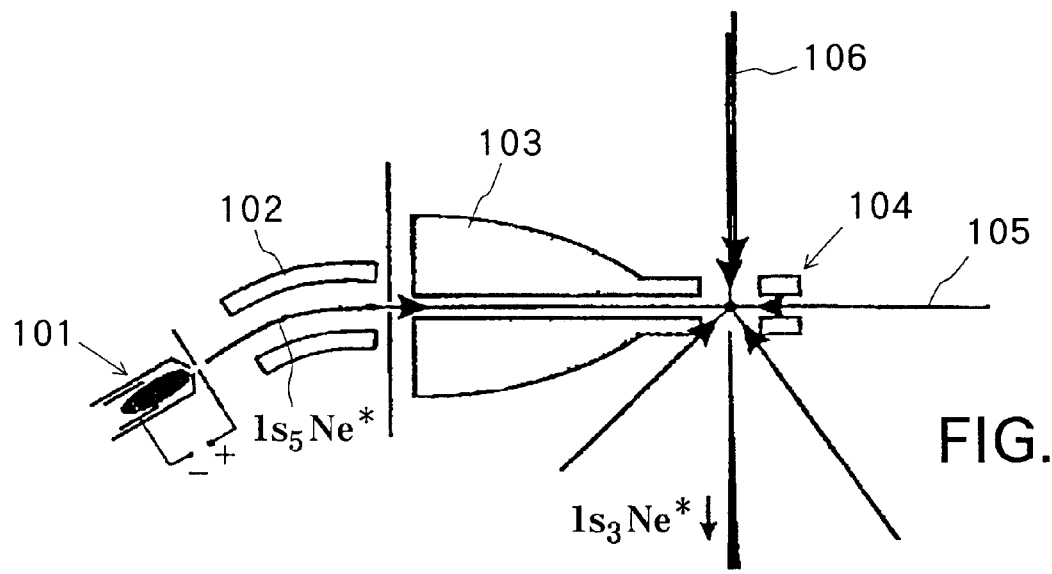
FIG. 1 is a view showing an example of a construction of an atomic beam generator which generates a coherent atomic wave.
Figure 2:
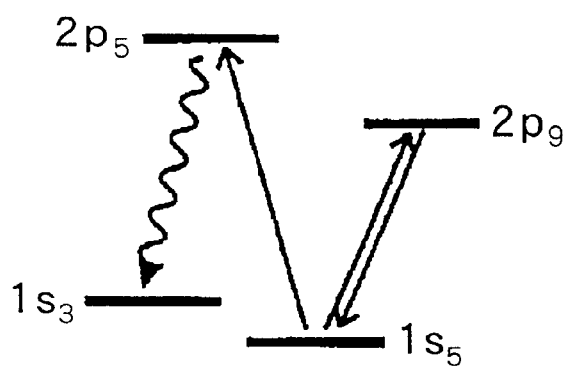
FIG. 2 is an energy level diagram of a neon (Ne) atom.

First, a method of generating a coherent atomic wave i is described. An example of an atomic beam generator which generates a coherent atomic wave is shown in FIG. 1. Here, neon atoms whose energy level diagram is shown in FIG. 2 is used to generate an atomic wave.

The atomic beam generator generates very low temperature atoms by a laser trapping method. In the present invention, an atomic beam source, a reflecting plate or a concave mirror which will be hereinafter described, a hologram and a substrate must be held in high vacuum.

The atomic beam generator includes discharger 101 which produces neutral Ne atoms excited by glow discharge. Excited species (Ne*) generated by discharger 101 are introduced into deflector 102 for removing ion species and so forth. Only Ne* in the $1s_5$ state which is a metastable state higher by 13 eV than the ground state of Ne are extracted from deflector 102 and enter Zemann decelerator 103 which forms a first stage region. Here, the asterisk (*) added to the shoulder of the atomic symbol represents that the atom is in an excited state. If it is assumed that the temperature is approximately 300 K, then the velocity of a Ne* atom is approximately 660 m/s.

Zemann decelerator 103 has a magnetic field gradient which decreases toward the flying direction of a Ne* atom. In FIG. 1, the shape of the Zemann decelerator corresponds to the magnetic field gradient. Into Zemann decelerator 103, light of a wavelength of 620 nm from a He—Ne laser is introduced as cooling laser beam 105 from the opposite side to the incoming direction of Ne*. In Zemann decelerator 103, if a Ne* atom absorbs cooling laser beam 105, then it transfers to the $2p_9$ state. However, since the life of the $2p_9$ state of Ne is extremely short, the Ne* atom emits spontaneous emission light and transits to the $1s_5$ state immediately. The process of absorption-emission is repeated a large number of times (for example, more than 20,000 times) in the inside of Zemann decelerator 103. Here, since cooling laser beam 105 enters from one direction and head-on collides with a Ne* atom and spontaneous emission light goes out in random directions and consequently the variation in momentum by release of photons in the absorption-emission process is 0 in average, the Ne* atom resultantly loses its momentum and is decelerated thereby.

Actually, by an influence of a Doppler effect upon the Ne* atom for a period in which it is decelerated from the velocity of approximately 660 m/s until it is stopped, the displacement of the resonance frequency by the Doppler effect is much larger than width $\gamma$ of the spectrum of the transition between states $1s_5$ and $2p_9$, and if the laser frequency is kept fixed, then the resonant condition is lost immediately. Since it is not practical to vary the laser frequency, in order to use a Zemann effect instead to vary the energy of transmission, Zemann decelerator 103 is provided, and Zemann decelerator 103 compensates a displacement of the resonance frequency, that is, a Doppler shift, with a Zemann effect to keep the resonance frequency fixed. Since the Doppler shift is large at the entrance of Zemann decelerator 103 and decreases as the Ne* atom is decelerated, Zemann decelerator 103 has a gradient in the magnetic field intensity of a solenoid (Doppler tuning solenoid) for compensating for the Doppler shift and has a magnetic field distribution which increases in proportion to the square root of the distance.

At the exit of Zemann decelerator 103, the velocity of a Ne atom is several tens m/s. At the exit of Zemann decelerator 103, magneto-optical trap 104 is provided in which a quadrupole magnetic field is formed and irradiation of lasers from four directions is performed so that a Ne atom is caught by magneto-optical trap 104 by a magneto-optical trap action. A reversal solenoid is provided on the center axis of the Doppler tuning solenoid of Zemann decelerator 103, and the quadrupole magnetic field is formed in a space between them. In the quadrupole magnetic field, in whichever direction an atom is displaced, it undergoes a Zemann effect by the magnetic field, and consequently, the resonance frequency of transition drops. Therefore, a laser beam normally directed to the center approaches a resonance state, and a Ne atom is normally acted upon by a force toward the center. Also a Doppler cooling acts simultaneously.

In this manner, Ne atoms are trapped at the center of the quadrupole magnetic field in magneto-optical trap 104 and form an atom cloud in a region in which they are trapped. The diameter of the atom cloud is less then 50 $\mu$m and proximate to that of a point light source. The temperature of the trapped Ne atoms is approximately 50 $\mu$K.

Then, transfer laser beam 106 of a wavelength of 598 nm is irradiated from above upon the trapped atoms so that the atoms may be released from the trap. Each trapped Ne atom changes from the $1s_5$ state to the $2p_5$ state by transfer laser beam 106, and emits photons corresponding to vacuum ultraviolet light and changes to the $1s_3$ state, in which it is released from the trap. The released Ne atom drops freely in the gravitational field and is accelerated by the gravitational acceleration. If it is assumed that the Ne atom arrives at the surface of the hologram after it drops approximately 40 cm, where a standard gravitational field of the earth on the ground is presumed, the velocity of the Ne atom is 280 m/s and the de Bloglie wavelength in this instance is approximately 7 nm.

A coherent atomic wave can be generated in such a manner as described above. Here, while Ne is used in the description above, some other element can be used to generate a coherent atomic wave on condition that appropriate atom levels and laser light can be obtained. An atomic wave can be generated readily with, for example, Na (sodium), Al, Si, Ca, Ag (silver) or some other element.

Next, description is made for a method of forming a pattern by holography in which a coherent atomic wave generated in such a manner as described above.

Figure 3:
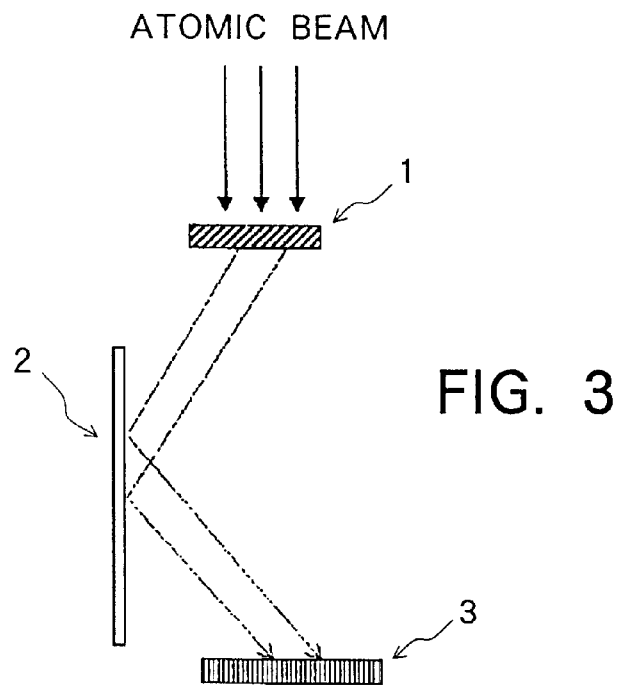
FIG. 3 is a diagrammatic view illustrating a principle of a pattern formation method according to the present invention and showing an example of an arrangement where a transmission hologram is used.

FIG. 3 is a diagrammatic view illustrating a basic principle of the pattern formation method according to the present invention and showing the most basic construction of the pattern formation apparatus in accordance with the present invention. An atomic wave which has been operated so as to include pattern information (i.e., reproduction image) by an atomic wave operation can effect quantum coherent reflection under particular conditions. In the example shown in FIG. 3, the atomic beam (of a wavelength typically of 7 nm) which has been cooled to approximately 50 $\mu$K by laser trapping and so forth and freely drops as coherent wave in the gravitational field enters and is diffracted by hologram 1 of the transmission type and interferes with each other. Reflecting plate 2 is disposed at an off-axis position with respect to an optical axis of the atomic beam before it enters hologram 1, and higher-order diffraction components of the first order or higher having passed through and diffracted by hologram 1 enter reflecting plate 2, at which they undergo quantum coherent reflection, whereafter they arrive at and are deposited on substrate 3. As a result, the hologram image is reproduced on substrate 3, and the element which forms the atomic beam is deposited on substrate 3 in accordance with a pattern corresponding to the hologram image.

Where a clean surface of boro-silicate glass (such as Pyrex; trade name of Corning Inc.) is used as reflecting plate 2, the atomic wave is reflected at an incidence angle of approximately 0.5 degrees. Here, if reflecting plate 2 is operated or the position of substrate 3 is varied by an XY stage not shown, a periodic pattern of the atomic beam holography can be successively formed on substrate 3. In other words,r pattern formation of the step-and-repeat type can be performed.

Figure 4:
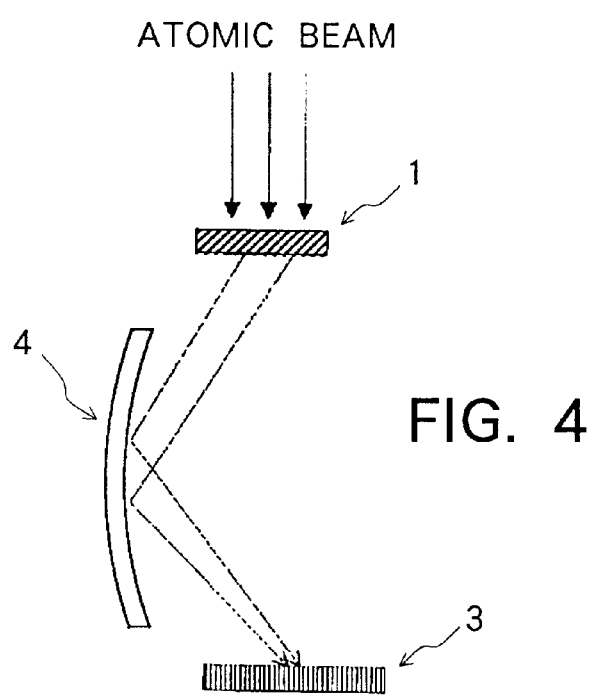
FIG. 4 is a diagrammatic view showing a construction wherein a concave mirror is used as a reflecting plane.
Figure 5:
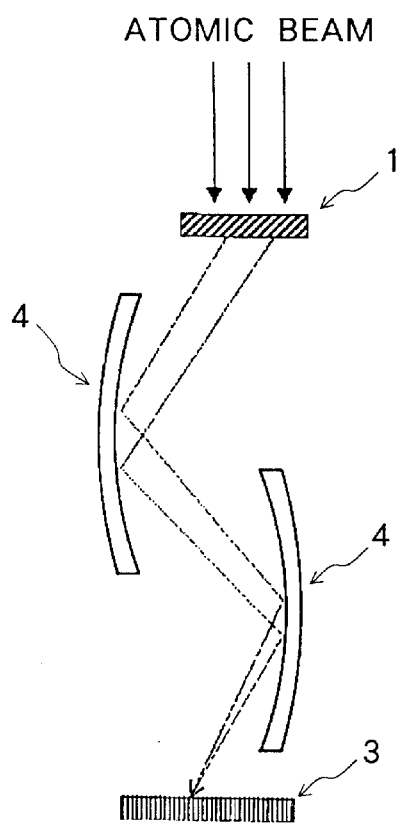
FIG. 5 is a diagrammatic view showing another construction wherein two concave mirror is used as reflecting planes.

FIG. 4 shows an example wherein the optical system shown in FIG. 3 employs concave mirror 4 as a reflecting plane for causing quantum coherent reflection. Since concave mirror 4 is used, the atomic wave is converged, and this allows reduced projection of a reproduction image. For concave mirror 4, a cylindrical plane mirror is used which is easy to produce and practical.

Where one cylindrical plane mirror is used as the concave mirror, if it is assumed that the perpendicular directions in a plane of substrate 3 are individually represented by an X direction and a Y direction and the axis of the cylinder of the cylindrical plane mirror is directed, for example, in the X direction, then the reproduction image on substrate 3 is reduced only in the Y direction. Therefore, it is a possible idea to employ a combination of two kinds of reflecting mirrors for reducing a reproduction image individually in the X direction and the Y direction as seen in FIG. 5. In the constitution shown in FIG. 5, two concave mirrors 4 each in the form of a cylindrical plane mirror are prepared and arranged such that the axes of the cylinders of them are directed in the X direction and the Y direction, respectively. Consequently, a diffraction wave emerging from hologram 1 is first introduced into and reflected by one of concave mirrors 4, and then introduced into and reflected by the other concave mirror 4, so that the atomic wave arrives at substrate 3.

Figure 6:
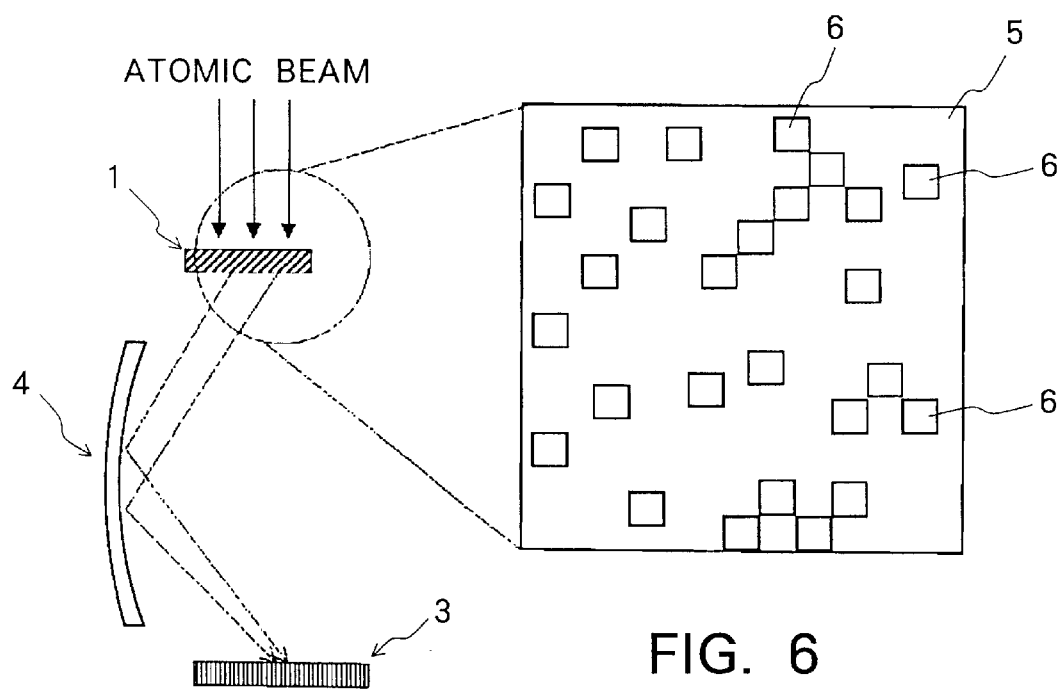
FIG. 6 is a diagrammatic view showing an example of a transmission binary hologram synthesized by a computer.

The reflecting optical systems used in the pattern formation apparatus described hereinabove with reference to FIGS. 3 to 5 employ transmission hologram 1. FIG. 6 shows an example of a transmission hologram which is used in such pattern formation apparatus as described above. Here, an optical system wherein a binary hologram synthesized by a computer is used is shown. The transmission binary hologram produced by computer synthesis has a structure wherein substantially rectangular holes 6 through which an atomic beam passes approximately 100% are formed in a film (for example, silicon nitride film 5 whose thickness is 100 nm) which Ad does not pass an atomic beam therethrough. The positions of holes 6 in the binary hologram are determined by calculation of inverse Fourier transform from a pattern to be reproduced. In the binary hologram, a phase is represented by the positions of the holes and an amplitude is represented by the number of holes in a unit area. Typically, square cells of 300 nm square are arranged at the cell pitches of 300 nm, and whether each cell should be formed as a passing hole or not is determined in accordance with a result of calculation by a computer.

While, in a conventional method wherein a transmission hologram is used to directly form a pattern without using quantum coherent reflection, the final resolution depends on the size of holes for passing an atomic beam therethrough formed in the hologram, in the method of the present embodiment which utilizes quantum coherent reflection, it is possible to arbitrarily control the size of a reproduction pattern by adjusting the f-number (focal length) of the reflecting plane. Further, where the f-number of the reflecting plane is adjusted, if an ideal reflecting plane can be formed, then the wavelength of the atomic wave provides the final resolution.

Figure 7:
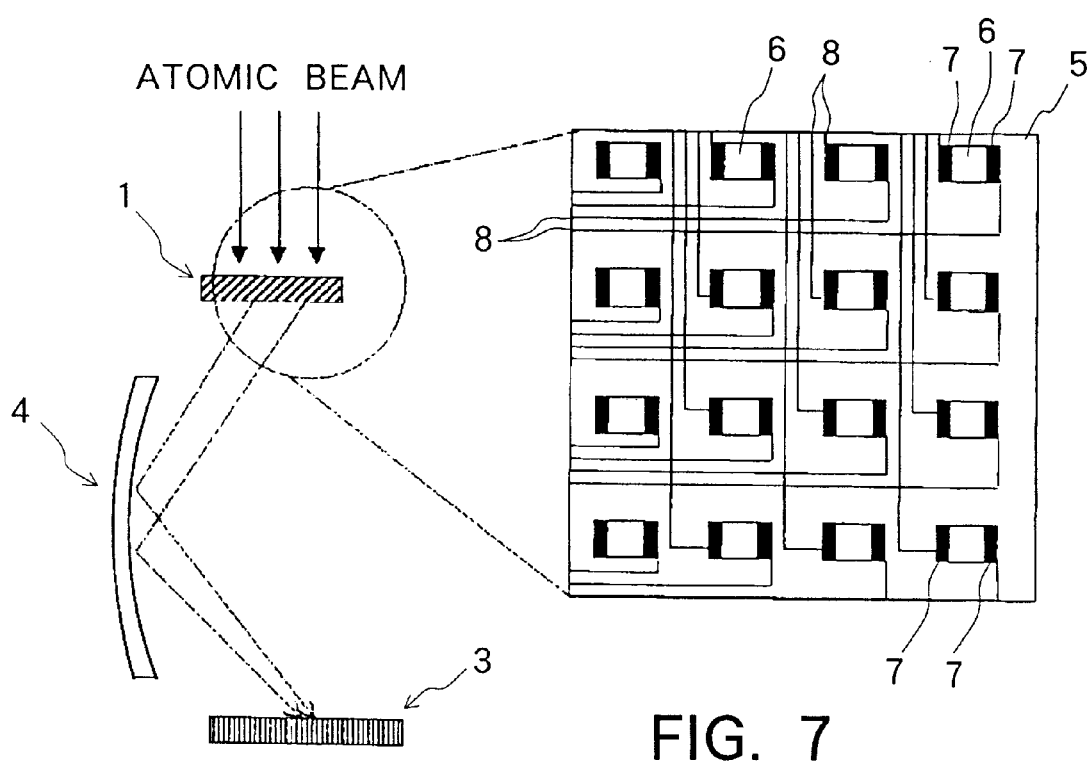
FIG. 7 is a diagrammatic view showing an example of a transmission hologram of the electric field modulation type.
Figure 8:
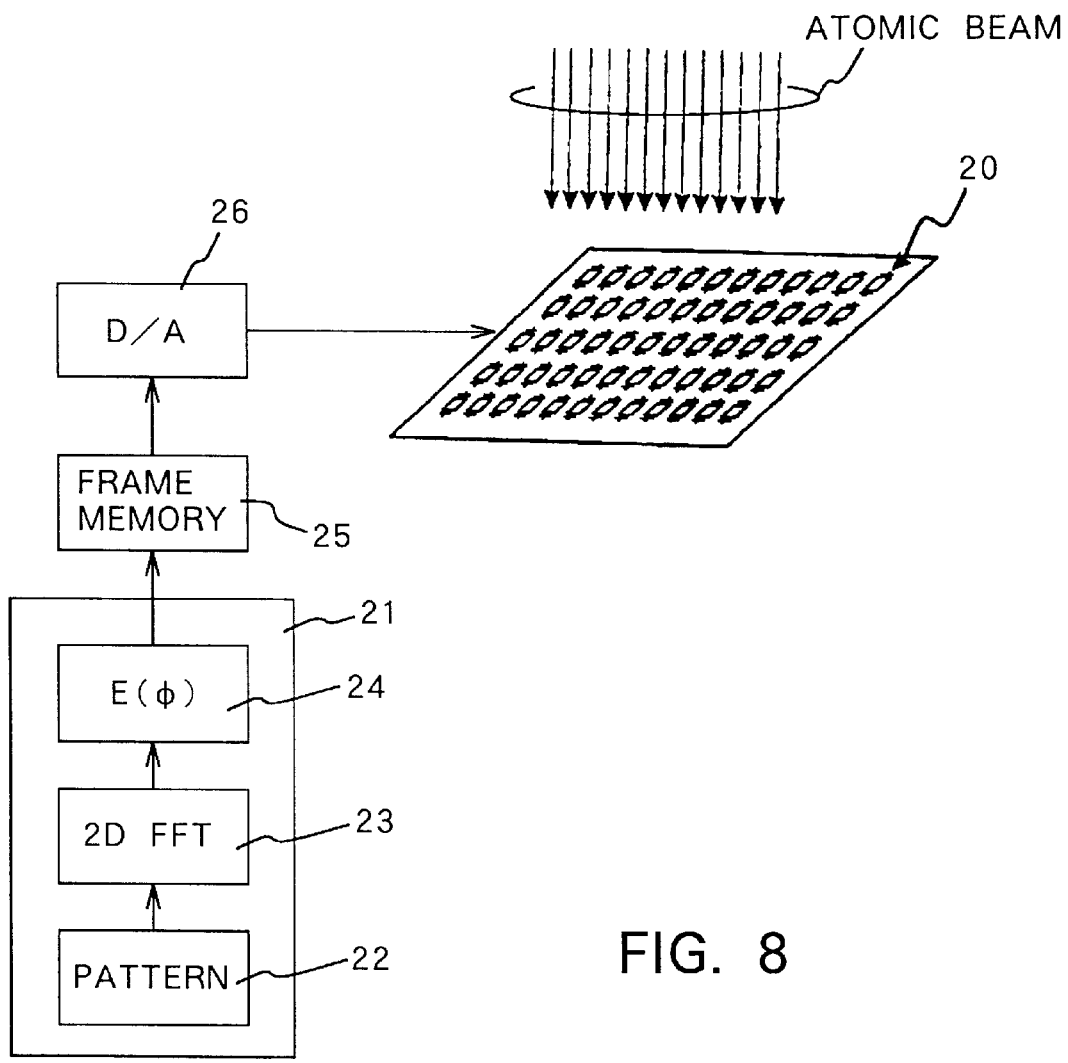
FIG. 8 is a block diagram showing a construction of a control system for controlling a transmission hologram of the field modulation type.

By pattern formation in which a transmission hologram and a reflecting optical system for an atomic beam are used, not only such a hologram of a "fixed pattern" as shown in FIG. 6, but also such a hologram of the electric field modulation type as shown, for example, in FIG. 7 can be utilized. A hologram of a fixed pattern signifies a hologram which corresponds to one reproduction image, and in order to change the pattern to be formed on a substrate, replacement of the hologram is required. On the other hand, a hologram of the electric field modulation type signifies a hologram which can generate an arbitrary hologram pattern by making use of the fact that the phase of the atomic wave is modulated by applying a potential to it. A characteristic of a hologram of the electric field modulation type resides in that, while the arrangement of cells is a two-dimensional array, an arbitrary holographic reproduction pattern can be obtained from the hologram only by controlling the potential. Here, a hologram of the electric field modulation type which makes use of a Stark effect of an atom by a potential to effect phase modulation as is disclosed in Japanese Patent Laid-Open No. Hei 10-039726 (JP, 10039726, A) by the inventors of the present invention is used.

According to the hologram of the electric field modulation type, atom passing cells are arranged in an array of a shape like that of, for example, a CCD (charge coupled device) image sensor, and the potentials to the cells are dynamically controlled to control the phases of atoms, which pass through the individual atom passing cells (i.e., holes), by a Stark effect. More particularly, go rectangular holes 6 for passing an atomic beam therethrough are formed in an array in, for example, so silicon nitride (SiN) film 5 of a thickness of 500 nm which is a film which does not pass an atomic beam therethrough, and electrodes 7 are provided along a pair of opposing sides of each of holes 6. Each hole 6 corresponds to one atom passing cell, and the phase variation of an atomic beam at each hole 6 is adjusted for each hole 6 by applying a voltage between a pair of electrodes 7 through electrode potential control lines B. The size of holes 6 is, for example, 1 $\mu$m, and such holes 6 are arranged, for example, in a pitch of 4 $\mu$m. Where a binary hologram (refer to FIG. 6) produced by computer synthesis and a hologram of the electric field modulation type are compared with each other, while, with the binary hologram, the phase is represented by the positions of the holes and the amplitude is represented by the number of holes in a unit area,r with the hologram of the electric field modulation type, the positions of the holes are fixed regularly.

Next, control of the voltage to be applied to each cell of the hologram of the electric field modulation type is described with reference to FIG. S.

Computer 21 for executing calculation for controlling hologram 20 of the electric field modulation type is provided. Computer 21 stores data of pattern 22 to be formed, performs two-dimensional fast Fourier transform (2D-FFT) 23 for pattern 22 to calculate phase information and further converts the phase information into potential information E(ø) 24. Frame memory 25 for storing such potential information for each cell is connected to computer 21. Further, D/A converter 26 for performing digital-to-analog conversion is interposed between frame memory 25 and hologram 20 of the electric field modulation type. Due to the provision of frame memory 25 and D/A converter 26, a voltage is applied to each passing hole based on potential information.

After pattern 22 to be formed on substrate 3 is read into computer 21, phase information for each cell is calculated by two-dimensional fast Fourier transform 23. The phase information of each cell is converted into potential information E(ø) 24 to be applied to the cell and is then stored into frame memory 25. Then, the information of the voltage to be applied is converted into an analog voltage value by D/A converter 26 and applied to electrodes 7 of the corresponding cell.

Hologram information can be set to hologram 20 of the electric field modulation type in this manner. Since computer 21 is used, if it is intended to form, on substrate 3, such a large pattern that it cannot be included in one hologram, the movement of a stage on which substrate 3 is placed should be controlled by computer 21 while the movement of the stage and the variation of a hologram pattern on hologram 20 of the electric field modulation type are performed in an interlocking a relationship to each other. The interlocking between the variation of the hologram pattern and the movement of the stage allows formation of a pattern over a wide area.

Where a hologram of the electric field modulation type is used, although it is superior in terms of the degree of freedom of a pattern to a transmission hologram having a fixed pattern, it is restricted in terms of the size of passing holes as electrodes are formed along the passing holes. Consequently, the hologram of the electric field modulation type is conventionally disadvantageous in that it is inferior in terms of the final resolution the hologram itself. However, the transmission hologram of the electric field modulation type is released from the restriction to the resolution which arises from the hole size of the hologram by combining it with quantum coherent reflection as in the present embodiment. Accordingly, the pattern formation method of the present invention provides a lithographic technique having a very high degree of freedom as a technique for forming an arbitrary pattern in an arbitrary very fine size by using a hologram of the electric field modulation type.

In the examples described hereinabove with reference to FIGS. 3 to 7, optical systems of atomic beam holography each of which employs a transmission hologram and a reflecting mirror. The present invention is not limited to use of a transmission hologram, but can be applied to a of construction of an optical system wherein a hologram of a reflection type is disposed on a reflecting plane which causes quantum coherent reflection.

Figure 9:
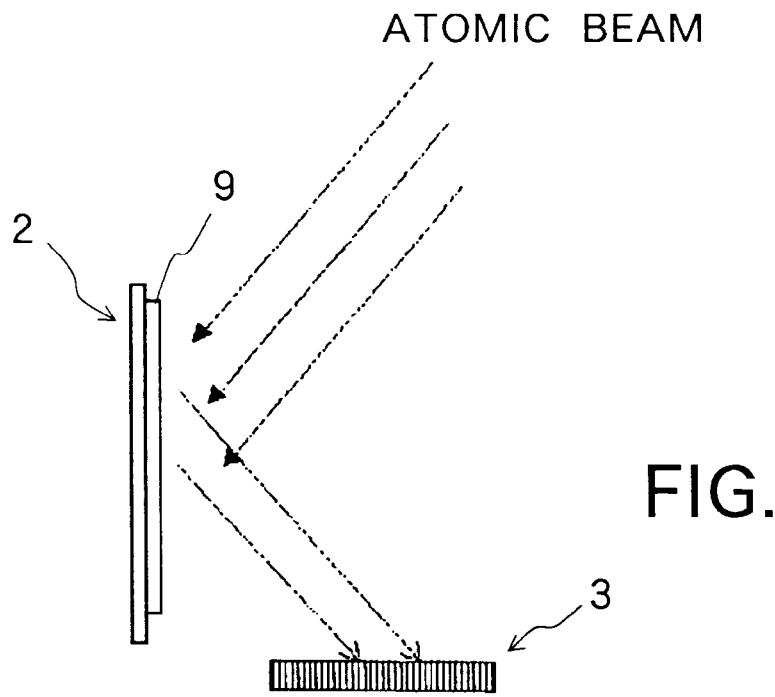
FIG. 9 is a diagrammatic view illustrating a principle of a pattern formation method according to the present invention and showing an example of a construction wherein a hologram is arranged on a reflecting plane.

FIG. 9 is a diagrammatic view showing a representative construction of an optical system wherein reflection hologram 9 is formed on reflecting plate 2 in the form of a flat plane.

An atomic wave formed by laser cooling or the like is introduced to reflecting plate 2 at an incidence angle smaller than critical angle θc to total reflection and causes total reflection. In quantum coherent reflection of an atomic beam, the coherence of atoms is maintained before and after the reflection of the atoms. Therefore, by processing hologram information on the reflecting plane of the plate 2 and keeping the condition wherein reflection hologram 9 is formed on reflecting plate 2, a reflected atomic beam interferes at reflection hologram 9 and forms an image of a pattern on substrate 3. Reflection hologram 9, that is, a dry plate having hologram information processed on reflecting plane thereof, is advantageous in that it has an overwhelmingly higher mechanical strength then a transmission hologram. As described hereinabove, in a transmission hologram, example, of approximately 100 nm in thickness) of silicon nitride or a like substance to form passing holes for atoms. However, in a reflection hologram, a popular Si semiconductor substrate for an LSI (large scale integrated circuit) or a like material can be utilized as a hologram material, and reflecting cells (reflection pixels) is formed in place of passing holes. The reflection pixels are required to have only a difference in height or aspect ratio from 0.5 to 2 times the pixel size from the non-reflecting cell. Since the incidence angle to the reflecting plane is small as can be seen from the following description, a reflected wave from a hollow portion is intercepted by a projecting portion, and therefore, the arrangement of projecting portions should be determined in accordance with a hologram pattern.

Depending on in what manner hologram information is distributed over the overall area of the hologram, in a transmission hologram, a pattern of the free standing type, that is, a pattern of cell holes which seems to be afloat in the air, is sometimes formed inevitably. On the contrary in a reflection hologram, even if a cell pattern of the free standing type is formed, since this is a pattern on the substrate, a hologram can be formed with certainty.

Figure 10:
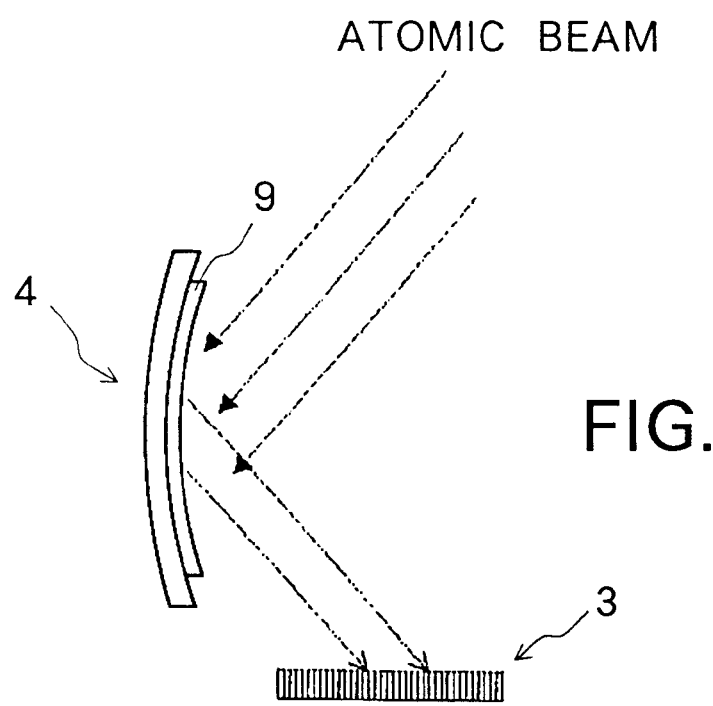
FIG. 10 is a diagrammatic view showing a construction wherein a concave mirror is used as a reflecting plane.
Figure 11:
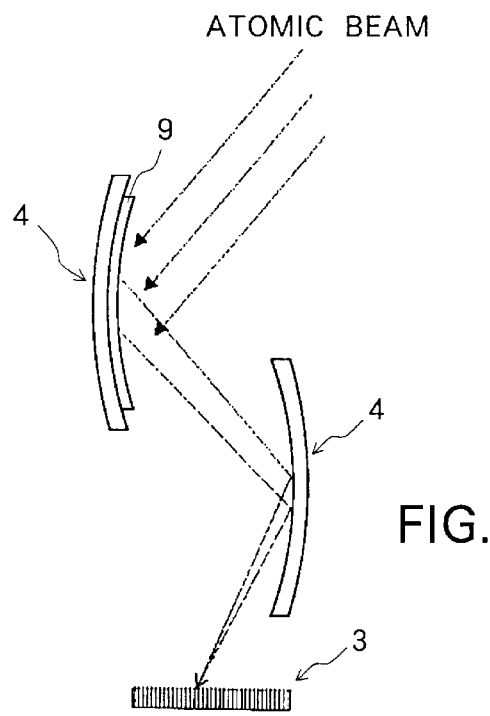
FIG. 11 is a diagrammatic view showing another construction where a concave mirror is used as a reflecting plane.

FIG. 10 shows another construction wherein reflection hologram 9 is provided on concave mirror 4. Here, in the reflection type atomic beam holography, a plane on which a hologram is to be formed, that is, a reflecting plane, is provided with a curvature to form a concave plane. However, the plane by which an atomic beam is to be reflected may be formed as a convex plane. Where the reflecting plane is provided with a curvature in this manner, reduced projection or expanded projection can be performed. Here, if the shape of the surface on which a hologram is to be formed, that is, the reflecting plane, is a cylindrical plane, then if it is assumed that the number of such reflecting planes is 1, then reduction (expansion) is performed only in one of the X direction and the Y direction as described hereinabove. Therefore, it is desirable to provide a plurality of reflecting planes. FIG. 11 shows a construction wherein two reflecting planes each having a curvature are provided. The number of reflecting planes is not limited to 2, but may be further increased. However, only the first reflecting plane to which an atomic beam is introduced has a reflection hologram provided thereon, and the atomic beam is quantum coherent reflected simply by the second and following reflecting planes along the route of the atomic beam. An optical system of reflection type atomic beam holography having a very high resolution can be formed by combining a plurality of reflecting planes in this manner.

Figure 12:
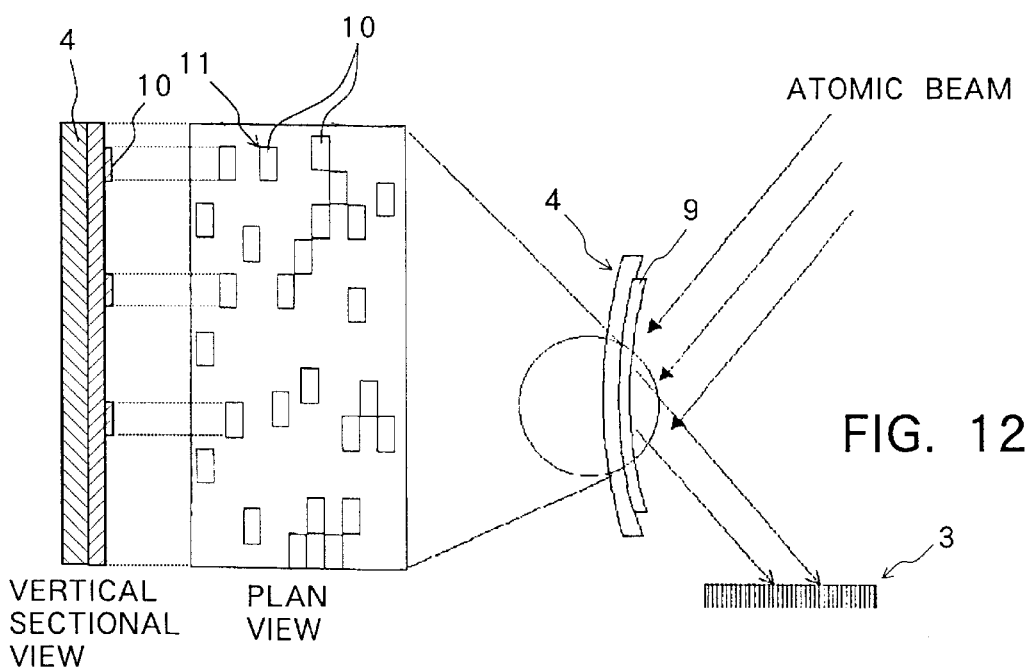
FIG. 12 is a diagrammatic view showing an example of a reflection binary hologram synthesized by a computer.

Also in reflection type atomic beam holography wherein a hologram is formed on a reflecting plane, it is suitable to utilize a binary hologram produced by computer synthesis as shown in FIG. 12 similarly as in the case of atomic beam holography wherein a transmission hologram is used. A reflection hologram has a reflectance for the atomic wave which can be varied by suitably selecting the material of the reflecting plane and so forth, and it is not impossible to produce a hologram which simultaneously modulates amplitude and phase of the atomic wave. However, in the present situation, it is technically difficult to produce a hologram wherein the reflectance of each reflection cell is controlled individually. Further, while a transmission hologram usually has an arrangement of substantially square cells, a pattern of a reflection hologram has an arrangement of rectangular cells whose shape is elongated in the reflection direction (in the vertical direction in FIG. 12) because incidence angle θ at which quantum coherent reflection is possible is small. Particularly, the hologram pattern is elongated in advance in the reflection direction by $1/(\sin \theta)$ time with respect to that of a transmission hologram.

Figure 13:
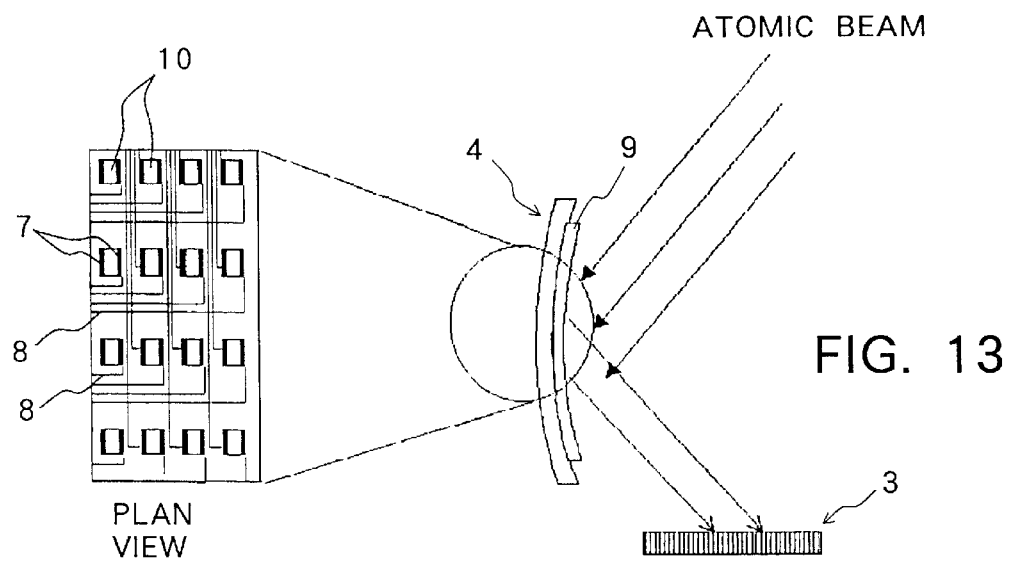
FIG. 13 is a diagrammatic view showing an example of a reflection hologram of the electric field modulation type.
Figure 14:
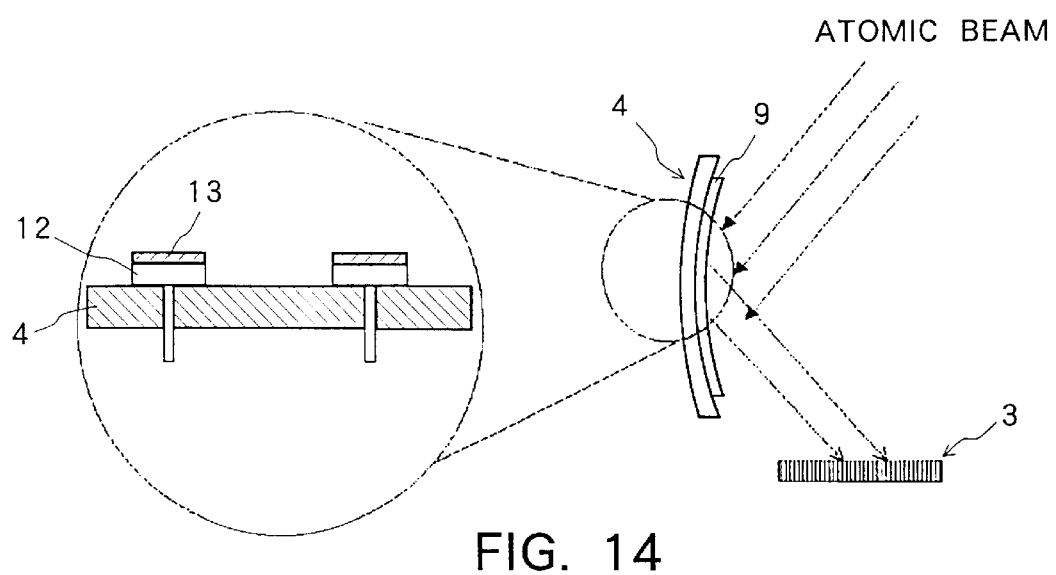
FIG. 14 is a diagrammatic view showing another example of a reflection hologram of the electric field modulation type.

A technique which has the highest value in utilization of reflection type holography is a technique which employs a reflecting plane of a reflection hologram of the electric field modulation type described below. An outline of it is shown in FIGS. 13 and 14. In the reflection hologram of the electric field modulation type shown in FIG. 13, a pair of electrodes 7 for controlling the potential on the reflecting plane are formed on the opposite sides of each of reflection cells of the reflecting plane similarly as in the case of the transmission hologram shown in FIG. 7, and the potential of the reflecting plane is locally controlled by applying a voltage between electrodes 7 through electrode potential control lines 8.

In the reflection hologram of the electric field modulation type shown in FIG. 14, electrode 12 for controlling the potential of a reflecting plane is formed at a lower portion of each reflecting cell. A hologram which forms the reflecting plane is formed on, for example a Si semiconductor substrate similarly to the reflection hologram shown in FIG. 9. However, the shape of cells of the hologram is rectangular and different from that of the transmission hologram shown in FIG. 7. The rectangular reflecting cells are arranged two-dimensionally in rows and columns, and electrode 12 is formed on the surface of each cell and the surface of each electrode 12 is coated with a material having a high reflectance such as $SiO_2$ to present reflecting plane 13. The electrode potentials of the reflecting cells can be set independently of one another and arbitrarily by a two-dimensional decoder circuit (not shown in FIG. 14) for the X direction and the Y direction formed around the cells in a similar manner as in a CCD element. Since an electrode potential is provided to each reflecting cell by time division driving, a holding circuit (not shown) for holding a voltage between time division driving cycles is provided for each reflecting cell.

The principle of operation of this reflection hologram is similar to that of the transmission hologram of the electric field modulation type shown in FIG. 7 in that, when an atomic wave is reflected, atoms undergo a Stark effect by local potentials to modulate the phase of the atomic wave to thereby provide information of a reproduction image to the atomic beam. Since the reflecting plane has a very large radius of curvature, an easy method of forming this hologram is to mechanically apply, after a hologram plane with electrodes is formed on a flat plane, tension to the hologram plane to provide a curvature to it first and then provide a permanent curvature to the reflecting plane by heat treatment or a like method.

Figure 15:
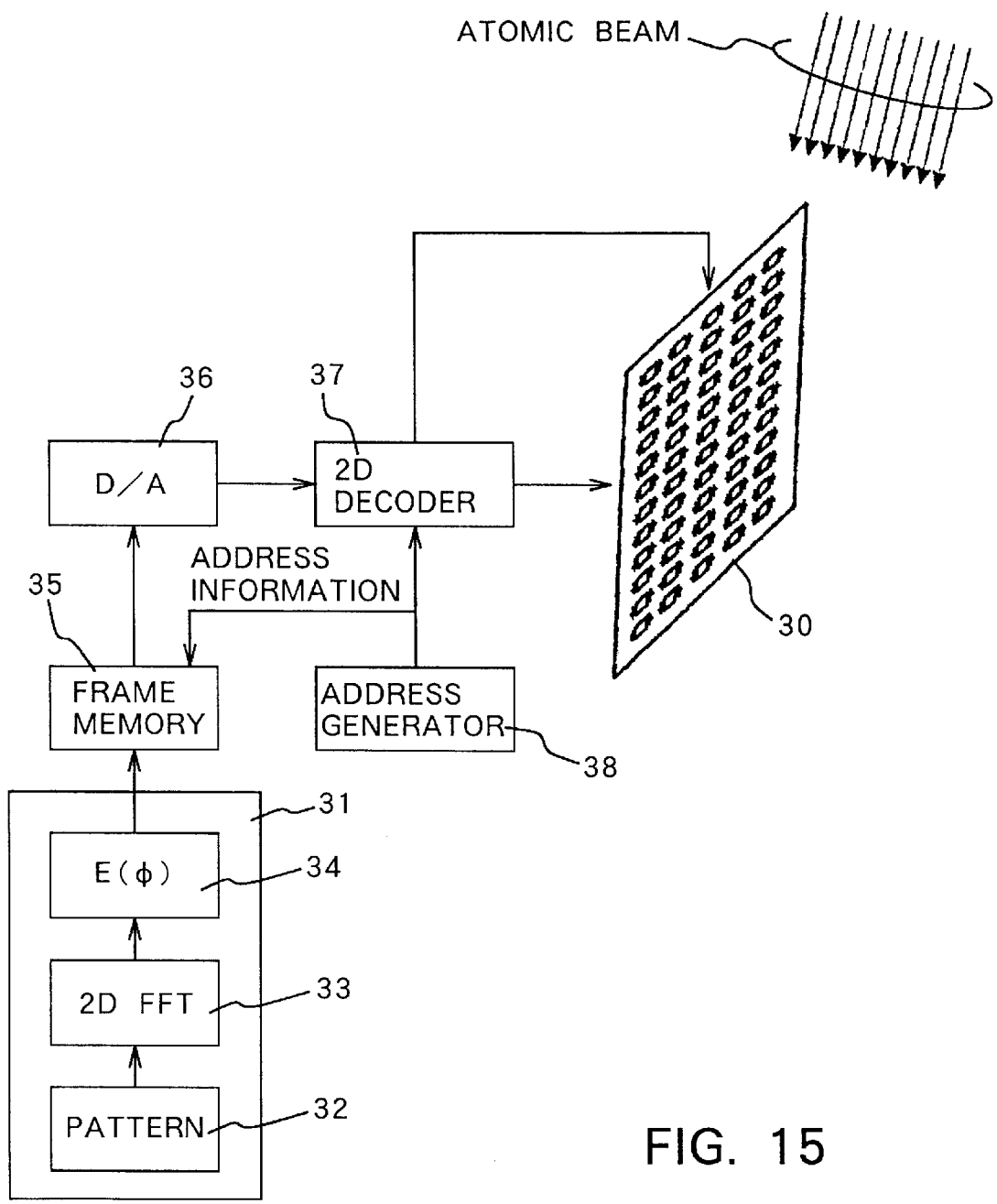
FIG. 15 is a block diagram showing a construction of a control system for controlling a reflection hologram of the field modulation type.

Next, control of a voltage to be applied to each cell of the hologram of the electric field modulation type shown in FIG. 14 is described with reference to FIG. 15.

Computer 31 for executing calculation for controlling hologram 30 of the electric field modulation type is provided. Computer 31 stores data of pattern 32 to be formed, performs two-dimensional fast Fourier transform 33 for pattern 32 to calculate phase information, and converts the phase information into potential information E(ø) 34. Frame memory 35 for storing potential information of the individual cells is connected to computer 31, and D/A converter 36 which performs digital-to-analog conversion is interposed between frame memory 35 and hologram 30 of the electric field modulation type.

An output of D/A converter 36 is supplied to two-dimensional decoder circuit 37. Two-dimensional decoder circuit 37 provides an output signal of D/A converter 36 to a cell on hologram 30 designated with address information. Further, address generator 38 for generating address information is provided, and the address information generated by address generator 38 is fed to two-dimensional decoder circuit 37 and fed as a read address also to frame memory 35.

When pattern 32 to be formed on substrate 3 is read into computer 31, phase information of each cell is calculated by two-dimensional fast Fourier transform 33. The phase information of each cell is converted into potential information E(ø) 34 to be applied to the cell and stored into frame memory 35. Address generator 38 successively generates addresses for the cells. Consequently, information of voltages to be applied to the individual cells is successively converted into analog voltage values by D/A converter 36 and applied to the electrodes of the cells by two-dimensional decoder circuit 37. Hologram information of hologram 30 of the electric field modulation type can be set in this manner.

It is to be understood that variations and modifications of the method and apparatus for forming a pattern by atomic bean holography disclosed herein will be evident to those skilled in the art. It is intended that all such modifications and variations be included within the scope of the appended claims.

What is claimed is:

1. A pattern formation method for forming a pattern on a substrate by atomic beam holography, comprising:
   introducing an atomic beam having a coherence to a hologram of a transmission type so that the atomic beam may be modulated by the hologram;
   introducing the modulated atomic beam to a reflecting plane so that the modulated atomic beam may be reflected by the reflecting plane while the modulated atomic beam keeps phase information; and
   introducing the atomic beam reflected from the reflecting plane to the substrate,
   wherein a motion of the beam is due to gravity,
   and wherein the reflecting plane and are parallel to a direction of gravity and perpendicular to the substrate and transmission grating.

2. A pattern formation method according to claim 1, wherein the atomic beam is generated by cooling and so trapping neutral atoms by laser cooling and letting the neutral atoms drop freely in a gravitational field.

3. A pattern formation method according to claim 1, wherein a plurality of reflecting planes are prepared, and the atomic beam arrives at the substrate after the atomic beam is successively reflected by the plurality of reflecting planes.

4. A pattern formation method according to claim 3, wherein at least one of the plurality of reflecting planes has a curvature.

5. A pattern formation method according to claim 1, wherein the reflecting plane has a curvature.

6. A pattern formation method according to claim 1, wherein the hologram is produced by computer synthesis based on a pattern to be formed on the substrate.

7. A pattern formation method for forming a pattern on a substrate by atomic beam holography, comprising:
   introducing an atomic beam to a hologram of a reflection type so that the atomic beam may be modulated and reflected by the hologram; and
   forming a pattern on the substrate by introducing the atomic beam reflected from the hologram to the substrate,
   wherein the hologram has a curvature,
   wherein the motion of the beam is due to gravity,
   and wherein a the reflecting plane and reflection grating surfaces are parallel to a direction of gravity and perpendicular to the substrate.

8. A pattern formation method for forming a pattern on a substrate by atomic beam holography, comprising the steps of:
   introducing an atomic beam to a hologram of a reflection type so that the atomic beam may be modulated and reflected by the hologram; and
   forming a pattern on the substrate by introducing the atomic beam reflected from the hologram to the substrate,
   wherein the motion of the beam is due to gravity, and
   wherein a reflecting plane is interposed between the hologram and the substrate such that the atomic beam emerging from the hologram is reflected by the reflecting plane while the atomic beam keeps phase information and then the atomic beam arrives at the substrate
   wherein the reflecting plane and reflection grating surfaces are parallel to a direction of gravity and perpendicular to the substrate.

9. A pattern formation method according to claim 8, wherein the hologram and/or the reflecting plane have a curvature.

10. A pattern formation apparatus for forming a pattern on a substrate by atomic beam holography, comprising:
- an atomic beam generator for generating a coherent atomic beam;
- a hologram of a transmission type for modulating the atomic beam introduced thereto from the atomic beam generator; and
- a reflecting plane for reflecting the atomic beam emerging from the hologram while the atomic beam keeps phase information so that the atomic beam is introduced to the substrate.

11. A pattern formation apparatus according to claim 10, wherein the atomic beam generator generates the atomic beam by cooling and trapping neutral atoms by laser cooling and letting the neutral atoms drop freely in a gravitational field.

12. A pattern formation apparatus according to claim 10, further comprising a plurality of reflecting planes, the atomic beam arriving at the substrate after the atomic beam is successively reflected by the plurality of reflecting planes.

13. A pattern formation apparatus according to claim 10, wherein the reflecting plane has a curvature.

14. A pattern formation apparatus according to claim 10, wherein the hologram is produced by computer synthesis based on a pattern to be formed on the substrate.

15. A pattern formation apparatus according to claim 14, wherein the hologram represents a binary hologram of two values produced by computer synthesis as passing holes for the atomic beam.

16. A pattern formation apparatus according to claim 14, wherein the hologram is a hologram of the potential control type wherein passing holes for each of which an electrode is formed are arranged as a two-dimensional array and potentials for the individual passing holes are controlled in accordance with the pattern to be formed on the substrate.

17. A pattern formation apparatus according to claim 16, further comprising:
- calculation means for performing Fourier transform for the pattern to be formed to produce phase information for the passing holes and producing potential information for the individual passing holes based on the phase information; and
- voltage application means for applying a voltage for each of the passing holes based on the potential information.

18. A pattern formation apparatus for forming a pattern on a substrate by atomic beam holography, comprising:
- an atomic beam generator for generating a coherent atomic beam; and
- a hologram of a reflection type for modulating and reflecting the atomic beam introduced thereto so that a pattern may be formed on the substrate by introducing the atomic beam to the substrate
    wherein a motion of the beam is due to gravity,
    and wherein a the reflection plane and reflection grating surfaces are parallel to a direction of gravity and perpendicular to the substrate,
    wherein the hologram has a curvature.

19. A pattern formation apparatus for forming a pattern on a substrate by atomic beam holography, comprising:
- an atomic beam generator for generating a coherent atomic beam;
- a hologram of a reflection type for modulating and reflecting the atomic beam introduced thereto so that a pattern may be formed on the substrate by introducing the atomic beam to the substrate; and
- a reflecting plane interposed between the hologram and the substrate such that the atomic beam emerging from the hologram is reflected by the reflecting plane while the atomic beam keeps phase information and then the atomic beam arrives at the substrate
    wherein a motion of the beam is due to gravity,
    and wherein the reflection plane and reflection grating surfaces are parallel to a direction of gravity and perpendicular to the substrate.

20. A pattern formation apparatus according to claim 19, wherein the hologram of the reflection type and/or the reflecting plane have a curvature.

21. A pattern formation apparatus for forming a pattern on a substrate by atomic beam holography, comprising:
- an atomic beam generator for generating a coherent atomic beam; and
- a hologram of a reflection type for modulating and reflecting the atomic beam introduced thereto so that a pattern may be formed on the substrate by introducing the atomic beam to the substrate,
    wherein the hologram represents a binary hologram of two values produced by computer synthesis by coherent reflection and random scattering of the atomic beam;
    wherein the hologram is produced by computer syntheses based on a pattern to be formed on the substrate,
    wherein a motion of the beam is due to gravity,
    and wherein a reflection plane and the reflection grating surfaces are parallel to a direction of gravity and perpendicular to the substrate,
    and wherein the hologram is a hologram of the electric field control type wherein very small reflecting mirrors for each of which an electrode is formed are arranged as a two-dimensional array and potentials for the individual very small reflecting mirrors are controlled in accordance with the pattern to be formed on the substrate.

22. A pattern formation apparatus according to claim 21, further comprising:
- calculation means for performing Fourier transform for the pattern to be formed to produce phase information for the very small reflecting mirrors and producing potential information for the individual very small reflecting mirrors holes based on the phase information; and
- voltage application means for applying a voltage for each of the very small reflecting mirrors based on the potential information.

* * * * *